United States Patent Office 3,471,249
Patented Oct. 7, 1969

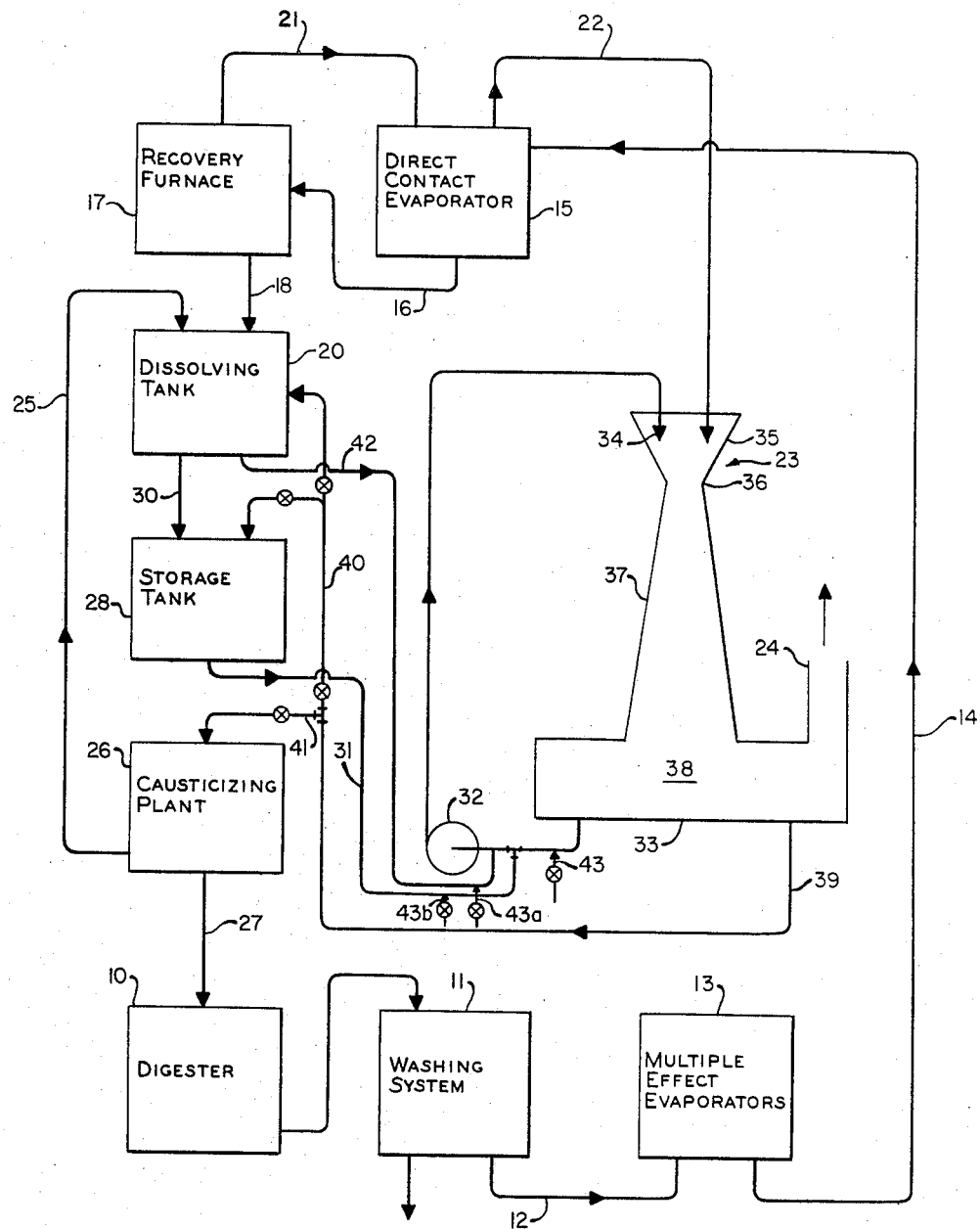

3,471,249
SYSTEM FOR ABSORBING H₂S GASES
Henry P. Markant, Alliance, Norman D. Phillips, Lancaster, and Indravadan S. Shah, Alliance, Ohio, assignors to The Babcock & Wilcox Company, New York, N.Y., a corporation of New York
Filed Feb. 2, 1965, Ser. No. 429,801
Int. Cl. B01d $53/34, 53/14$; C01d $11/00$
U.S. Cl. 23—2
6 Claims

ABSTRACT OF THE DISCLOSURE

Hydrogen sulfide is removed from gases containing carbon dioxide by contacting said gases with an absorbent solution containing sodium sulfide, sodium hydroxide and sodium carbonate at an absorbent solution to gas flow ratio of from 6 to 10, controlling the ratio of the weight of sodium sulfide in the absorbent to the weight of hydrogen sulfide in the gas so as to be greater than 35, controlling the weight ratio of sodium carbonate in the absorbent to the weight of hydrogen sulfide in the gas so as to be greater than 30 and controlling the molar concentration of sodium sulfide in the absorbent to be greater than 0.1 times the molar concentration of sodium hydrosulfide.

---

The present invention relates to the selective absorption of hydrogen sulfide ($H_2S$) from flue gases at temperatures less than 350° F. containing $H_2S$, carbon dioxide ($CO_2$), and other gases, and more particularly to the absorption of $H_2S$ gas contained in effluent gases of temperatures less than 350° F. resulting from the incineration and evaporation of residual pulp liquor in the sulphate process of pulp and paper production.

The presence of $H_2S$ gas in the gases discharged to the atmosphere from industrial processes is undesirable both from the standpoint of chemical loss and from the resultant air pollution nuisance to the surrounding countryside. Absorption systems are known by which $H_2S$ can be absorbed, but most of such systems are only applicable to high $H_2S$ concentrations in the effluent gases, are usually operated at super atmospheric pressures, and usually necessitate use of absorbing chemical solutions which may have to be purchased. In the sulphate (or kraft) process for the production of paper pulp, the gases released from the chemical recovery furnace on burning concentrated pulp residual liquor ("black liquor") may contain $H_2S$ gas resulting from particular furnace operating conditions, but in most pulp mill installations, the $H_2S$ is released during the usual direct contact liquor concentration where hot combustion gases are used to concentrate the partially concentrated liquor prior to its incineration. The removal of $H_2S$ from the gases is particularly desirable to minimize the air pollution nuisance.

We have found that existing chemical solutions from pulp mills can be used as $H_2S$ absorbing solutions. According to the invention, the so-called "green liquor" formed by dissolving "smelt" from a chemical recovery furnace in water and/or chemical solution, and as weak wash liquor being returned from the causticizing step of the sulphate process, is advantageously used as the $H_2S$ absorbing liquor. The usual green liquor in the sulfate pulping and recovery process contains about 12 percent (by weight) $Na_2CO_3$, about 3 percent (by weight) $Na_2S$ plus other sodium bearing compounds, while the weak wash liquor includes NaOH as well as other chemical compounds. The proportions and quantity of the chemical compounds in any pulp mill installation may vary from the values given but will generally approximate those values.

The composition of the "green liquor" and/or the weak wash liquor may be modified when necessary by the addition of other solutions containing sodium bearing compounds such as sodium carbonate ($Na_2CO_3$) solution, sodium hydroxide (NaOH) solution, or sodium sulphide ($Na_2S$) solution.

Gases containing both $H_2S$ and $CO_2$ may react in contact with a "green liquor" containing $Na_2CO_3$, $Na_2S$ and NaOH according to the following reactions:

(1) $Na_2S + H_2S \rightleftharpoons 2NaHS$
(2) $Na_2CO_3 + H_2S \rightleftharpoons NaHS + NaHCO_3$
(3) $2NaOH + H_2S \rightleftharpoons Na_2S + 2H_2O$
(4) $Na_2S + CO_2 + H_2O \rightleftharpoons NaHCO_3 + NaHS$
(5) $NaHS + CO_2 + H_2O \rightleftharpoons NaHCO_3 + H_2S$
(6) $Na_2CO_3 + CO_2 + H_2O \rightleftharpoons 2NaHCO_3$
(7) $2NaOH + CO_2 \rightleftharpoons Na_2CO_3 + H_2O$
(8) $CO_2 + OH^- \rightleftharpoons HCO_3^-$ It will be observed from the preceding equations that $H_2S$ may be absorbed by sodium carbonate, sodium sulphide and sodium hydroxide. It will also be observed that all of the reactions are reversible, and providing proper time of contact between gas and liquid, and by maintaining proper concentrations of $Na_2S$, $Na_2CO_3$, and NaOH in the absorbing liquor, the reactions, except reaction 5, can be made to occur from left to right. If this is not done, then there are possibilities of either one or all reactions 1, 2, 3, to occur from right to left and reaction 5 from left to right, and thus releasing the so absorbed $H_2S$ gas. It has been found that the molar ratio of $Na_2S$ to NaHS sodium hydrosulphide has to be maintained greater than 0.1 so as not to reverse reactions 1, 2 and release $H_2S$ from solution according to reactions 1, 2, and 5. It has been found that the reactions (4, 5, 6) involving $CO_2$ are slow chemical reactions as $CO_2$ has to react first with hydroxyl ion ($OH^-$) of water to form bicarbonate ion ($HCO_3^-$) according to reaction 8. This $HCO_3^-$ ion then reacts with $Na^+$ ion of sodium carbonate, sodium sulphide or sodium hydrosulphide. The reactions 3 and 7 involving sodium hydroxide are faster reactions, and forms $Na_2S$ and $Na_2CO_3$ by absorbing $H_2S$ and $CO_2$ respectively. The so formed $Na_2CO_3$ and $Na_2S$ will then further react with $CO_2$ and $H_2S$ according to Equations 1, 2, 4, and 6, depending on the time of contact between gas and liquor.

Whereas the $H_2S$ absorption is found to be controlled by the presence of gas film and also by diffusional phenomena, which means that higher gas flow rates will favor the absorption of $H_2S$.

It has been found that hydrogen sulphide can be selectively absorbed in the "green liquor" solution or other solutions as mentioned before without absorbing much of the $CO_2$ present, when proper flow rates are utilized and a proper mass transfer equipment is used to minimize the contact time between the effluent gases and the "green liquor".

To attain higher gas flows and turbulence in the liquid phase and to operate the mass transfer device under $H_2S$ absorption conditions, a venturi-like device as an absorbing instrument has been found highly suitable. Other more conventional mass transfer devices, such as packed tower, plate tower, open spray tower, etc., can also be used to absorb $H_2S$ from flue gases, with greatly reduced effectiveness.

From an effluent gas containing $H_2S$, efficient absorption of $H_2S$ can be attained by properly maintaining the $Na_2S$, $Na_2CO_3$, and NaOH concentration in the spray liquor. The spray liquor can be made up of any or all of three different streams, namely (a) recirculated liquor, (b) make-up liquor from either the dissolving tank or the storage tank, and (c) a make-up liquor flow of either $Na_2CO_3$ solution, NaOH solution, $Na_2S$ solution, weak wash or white liquor. The liquor stream (b) should be added to the recirculated liquor in such amounts as determined by a critical relationship between the $Na_2S$ content and/or $Na_2CO_3$ content in stream (b) and the $H_2S$ content entering the absorption system as required to maintain a desired outlet $H_2S$ concentration. The desired value of the ratio of $Na_2S/H_2S$ (lb./lb.) should be of the order of 35, and that for $Na_2CO_3/H_2S$ (lb./lb.) should be of the order of 30.

To maintain proper concentration of active chemicals in stream (b) and to avoid the release of $H_2S$ gas from the solutions in dissolving tank and storage tank according to Equations 1, 2, and 5, it is desirable to controllably split the product liquor stream from the absorption system into two streams, one entering the causticizing plant, and the other entering either the storage tank or the dissolving tank. It has been found desirable to maintain a proper concentration of $Na_2S$ and/or $Na_2CO_3$ in the spray liquor such that the ratio $Na_2S/NaHS$ and/or $Na_2CO_3/NaHS$ (molar basis) is always greater than 0.1, in order to efficiently absorb $H_2S$ from the effluent $H_2S$ containing gases.

The various features of novelty which characterize our invention are pointed out with particularity in the claims annexed to and forming a part of this specification. For a better understanding of the invention, its operating advantages and specific objects attained by its use, reference should be had to accompanying drawing and descriptive matter in which we have illustrated and described a preferred embodiment of the invention.

The drawing is a schematic flow diagram, of a pulp mill sulphate or kraft process for chemical and heat recovery in accordance with the present invention.

As shown, wood chips are digested in a digester 10 by contact with a suitable sodium base cooking liquor. After completion of the digestion process the liquid and solids from the digester are discharged to a washing system 11 where the pulp is separated from the residual pulp liquor. The residual liquor is then passed through a conduit 12 to multiple effect evaporators 13 for concentration. Ordinarily the liquor leaving the washing system will have a solids content of from 10 to 20 percent by weight and will be concentrated in the multiple effect evaporators to a solids content of the order of 45 to 55 percent by weight.

The partially concentrated residual liquor is passed from the multiple effect evaporators through a conduit 14 to a direct contact evaporator 15 where the liquor is further concentrated prior to its incineration in a recovery furnace 17. The direct contact evaporator 15 may be of any of the well-known types known to the art where evaporation of water from the partially concentrated liquid is obtained by contact with hot flue gases leaving the recovery furnace 17. Ordinarily the concentrated residual liquor passing through the pipe 16 to the recovery furnace will have a solids content of the order of 60 to 65 percent by weight.

The combustion of the organic compounds in the concentrated residual liquor in the recovery furnace 17 results in the conversion of the inorganic matter in the liquor to a smelt which is discharged from the furnace 17 through a spout 18 to the dissolving tank 20.

The incineration of the concentrated residual liquor also results in the discharge from the furnace of effluent gases which ordinarily contain $CO_2$ and $SO_2$. These gases pass through a duct 21 connecting the furnace 17 with the direct contact evaporator 15. The direct intimate contact between the gases and the partially concentrated liquor reduces the moisture content of the latter and releases $H_2S$ gases which pass from the direct contact evaporator 15 through a duct 22 to an absorbing apparatus 23, where the $H_2S$ is at least partially removed and the gases are discharged through a stack 24 to the atmosphere.

The smelt delivered to the dissolving tank 20 contains sodium carbonate, sodium sulphide and other compounds. This smelt is dissolved in water and/or a weak wash solution which is delivered to the dissolving tank through a conduit 25 from causticizing plant 26. This solution from the dissolving tank, called "green liquor," is passed to a storage tank 28 through a conduit 30.

According to the present invention the solution from the storage tank 28 is passed in controlled quantities through a pipe 31 to the inlet side of a pump 32. If desired, all or part of the solution from dissolving tank 20 can be passed in controlled quantities through a pipe 42 to the inlet side of the pump 32. The flow of the solution through the pipe 31 or pipe 42 to the inlet side of the pump 32 is regulated by suitable valves to maintain a controlled weight of sodium sulphide relative to the weight of $H_2S$ gas passed through the duct 22 to the absorbing system 23. The weight ratio of $Na_2S$ in solution to $H_2S$ is, as determined from the critical relationship, maintained greater than 35, and in case of $Na_2CO_3$ it is maintained greater than 30. The $Na_2CO_3$ or NaOH or $Na_2S$ solution required to balance the sodium and sulphur quantities throughout the pulp mill can either be added at the inlet side of the pump 32 through a pipe 43, or it can be added to the solution flowing through pipes 31 or 42, as indicated at 43b and 43a respectively. If desired a part or all of the weak wash solution passing through pipe 25, or a part or all of the white liquor solution, can be added to the solution flowing through pipes 31, 42, or 43. The pump 32 also recirculates liquor withdrawn from the sump 33 of the $H_2S$ absorption system 23. The mixture of recirculated liquor and make-up solution (this can be made up of solutions flowing through 42 and 43 or 31) is sprayed through nozzles 34 into the inlet or converging end 35 of a venturi-like duct or tube 36 so as to be generally concurrent in its direction of flow with the effluent gases entering the tube 36 from the duct 22. The concentration of $Na_2S$ in the spray liquor is so maintained to attain a molar ratio of $Na_2S/NaHS$ greater than 0.1. The liquor and gas passing through the converging section 35 of the system 23 are accelerated in the tube for intimate and turbulent contact relationship therebetween. The gas and liquid mixture thereafter passes through a diverging outlet section 37 of the venturi-like tube 36 to enter a liquid and gas separating zone 38 formed directly above the sump 33. The gas thereafter turns above the sump 33 for discharge through the stack 44.

A part of the liquid from the sump is transferred through pipe 39 which is then split into two streams flowing through pipes 40 and 41. The solution flowing through pipe 41 enters the causticizing plant 26 whereas the solution flowing through pipe 40 can either enter storage tank 28 or dissolving tank 20. The split of the flow through pipe 39 into two flow streams flowing through pipes 41 and 40, is so controlled to maintain the proportions of chemicals in the dissolving tank 20 or storage tank 28 such that the molar ratio of $Na_2S$ to NaHS is always maintained above 0.1.

The use of a venturi-like device 23 for contact between the gase and the absorbing liquor has been found to be particularly effective in promoting the absorption of $H_2S$ by the absorbing liquor and suppressing the absorption of $CO_2$, since the time of contact between gas and liquor is short and the conditions favorable to the selective absorption of $H_2S$. The desired time of contact is accomplished by properly controlling the gas flow rate through the throat of the venturi. A gas flow velocity at the throat greater than 20–25 ft./sec. is found to be advantageous in controlling and directing the chemical reactions for the absorption of $H_2S$. With a liquor to gas flow ratio (lb./lb. wet basis) in the order of 6–10, a $H_2S$ content of about 1000 p.p.m. in the incoming gas can be reduced to approximately 100 p.p.m. By proper adjustments in flow rates and chemical concentration, higher $H_2S$ gas concentration (higher than 1000 p.p.m.) can be handled in this system, and can be reduced to approximately 100 p.p.m. or less. A $H_2S$ content of 100 p.p.m. in the gases passed to the atmosphere will practically avoid any air polution nuisance to the surrounding countryside.

This additional sulfur recovery ($H_2S$) may create an unbalance of sodium and sulfur in the already chemically balanced pulping process. To keep the sodium and sulfur in balance throughout the pulp mill, the sodium sulphate make-up (salt cake) is cut back (in proportion to sulfur recovery) and sodium is added either as sodium hydroxide or sodium carbonate or $Na_2S$. The sodium sulfate make-up can be totally eliminated, and instead $Na_2CO_3$, $Na_2S$, NaOH can be added.

It will be understood that two, or more, of the venturi-like absorption devices can be used in series to further reduce the $H_2S$ content of the gases discharged to the atmosphere.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. The process of absorbing gaseous $H_2S$ components in a flue gas containing $CO_2$ and less than 1% $H_2S$ which comprises passing said gas through an absorbing zone, spraying an absorbing liquid containing as active ingredients the compounds $Na_2S$, NaOH and $Na_2CO_3$ into said gas in said absorbing zone, said spray liquid being injected into said absorption zone in a ratio of from 6 to 10 (weight basis) to said gas flow, the absorption of $H_2S$ by said liquid forming NaHS as one stable compound, recirculating said liquid to said absorption zone, controlling the ratio of the weight of $Na_2S$ in said liquor to the weight of $H_2S$ in said gas to be greater than 35 and to control the ratio of the weight of $Na_2CO_3$ in said liquor to the weight of $H_2S$ in said gas to be greater than 30 and controlling the molar concentration of the $Na_2S$ in said sprayed liquor to be greater than 0.1 times the molar concentration of the NaHS in the liquor.

2. The process of claim 1 wherein the absorbing liquid comprises (a process) liquor of a sodium sulphate digestion system for the production of paper pulp.

3. The process of claim 1 wherein the flue gas containing $H_2S$ and $CO_2$ is cooled to a temperature below 350° F. before entering said absorption zone.

4. The process of claim 1 wherein the flue gas originates during the combustion of residual pulp liquor.

5. In a heat and chemical recovery system wherein a concentrated residual pulp liquor is incinerated to release a molten smelt and combustion gases, dissolving said smelt to produce a solution containing $Na_2S$, NaOH and $Na_2CO_3$, passing said combustion gases through a direct contact residual pulp liquor evaporator to concentrate the liquor prior to incineration, the gases leaving said liquor concentration step containing $CO_2$ and less than 1% $H_2S$, passing said $H_2S$ and $CO_2$ containing gases through an $H_2S$ absorption zone, contacting said gases by a liquid spray containing as active ingredients $Na_2S$, NaOH and $Na_2CO_3$ in said $H_2S$ absorption zone, said spray liquid being injected into said absorption zone in a ratio of from 6 to 10 (weight basis) to said gas flow, the absorption of $H_2S$ forming NaHS in the liquid, separating the liquid and gas leaving said absorption zone, recirculating a controlled quantity of said separate liquid to said liquid spray, and adding smelt solution to said spray liquid to control the ratio of the weight of $Na_2S$ in said liquor to the weight of $H_2S$ in said gas to be greater than 35 and to control the ratio of the weight of $Na_2CO_3$ in said liquor to the weight of $H_2S$ in said gas to be greater than 30 and to maintain a molar ratio of $Na_2S$ to NaHS greater than .1.

6. In a heat and chemical recovery system wherein a concentrated residual pulp liquor is incinerated to release a molten smelt and combustion gases, dissolving said smelt to produce a solution containing $Na_2S$, NaOH, and $Na_2CO_3$, passing said combustion gases through a direct contact residual pulp liquor evaporator to concentrate the liquor prior to incineration, the gases leaving said liquor concentration step containing $CO_2$ and less than 1% $H_2S$, passing said $H_2S$ and $CO_2$ containing gases through an $H_2S$ absorption zone at a velocity of at least 25'/second, contacting said gases by a liquid spray in said $H_2S$ absorption zone, said spray liquid being injected into said absorption zone in a ratio of from 6 to 10 (weight basis) to said gas flow, said liquid comprising a solution containing as active ingredients $Na_2S$, NaOH and $Na_2CO_3$, separating the liquid and gas leaving said absorption zone, the absorption of $H_2S$ forming NaHS in said liquid, recirculating a controlled quantity of said separated liquid to said liquid spray, and adding smelt solution to said spray liquid to control the ratio of the weight of $Na_2S$ in said liquor to the weight of $H_2S$ in said gas to be greater than 35 and to control the ratio of the weight of $Na_2CO_3$ in said liquor to the weight of $H_2S$ in said gas to be greater than 30 and to maintain a molar ratio of $Na_2S$ to NaHS greater than 0.1.

References Cited

UNITED STATES PATENTS

| 1,580,451 | 4/1926 | Sperr | 23—3 X |
| 1,918,153 | 7/1933 | Wagner | 23—3 |
| 2,083,213 | 6/1937 | Baehr et al. | 23—3 X |
| 2,747,962 | 5/1956 | Heitz et al. | 23—2 |
| 2,772,240 | 11/1956 | Trobeck et al. | 23—48 X |
| 3,250,591 | 5/1966 | Bergholm et al. | 23—48 |
| 3,323,858 | 6/1967 | Guerrieri | 23—48 |

OSCAR R. VERTIZ, Primary Examiner

E. C. THOMAS, Assistant Examiner

U.S. Cl. X.R.

23—48, 134